United States Patent

[11] 3,622,757

[72] Inventor Paul R. Hoffman
 Farmington, Mich.
[21] Appl. No. 860,964
[22] Filed Sept. 25, 1969
[45] Patented Nov. 23, 1971
[73] Assignee Burroughs Corporation
 Detroit, Mich.

[54] APPARATUS FOR ELECTRICALLY RESPONDING TO SURFACE DEVIATIONS ON A MOVING MEDIUM
5 Claims, 12 Drawing Figs.

[52] U.S. Cl. ..................................... 235/61.11D
[51] Int. Cl. ...................................... G06k 7/08
[50] Field of Search............................ 340/174,
 173 PM, 146.3, 347; 235/61.11, 61.112, 61.113,
 61.114, 61.115, 61.11 D

[56] References Cited
UNITED STATES PATENTS
2,994,072  7/1961  Woody............................235/61.114 UX
3,027,072  3/1962  Levin et al.....................235/61.113 UX
3,032,750  5/1962  Nelson et al. ..................235/61.114 UX
3,439,117  4/1969  Mathmel et al................ 340/174

Primary Examiner—Maynard R. Wilbur
Assistant Examiner—William W. Cochran
Attorneys—Kenneth L. Miller and Wallace P. Lamb ABSTRACT: An apparatus for electrically responding to indicia in the form of surface deviations or perforations on a moving medium having a magnetic flux source that periodically activates in response to the indicia on the medium, thereby periodically inhibiting electrical pulses that are induced by another flux source at a predetermined rate in an electrical conductor, resulting in the conductor having an induced electrical output corresponding to the indicia on the medium.

PATENTED NOV 23 1971 3,622,757

INVENTOR.
PAUL R. HOFFMAN.

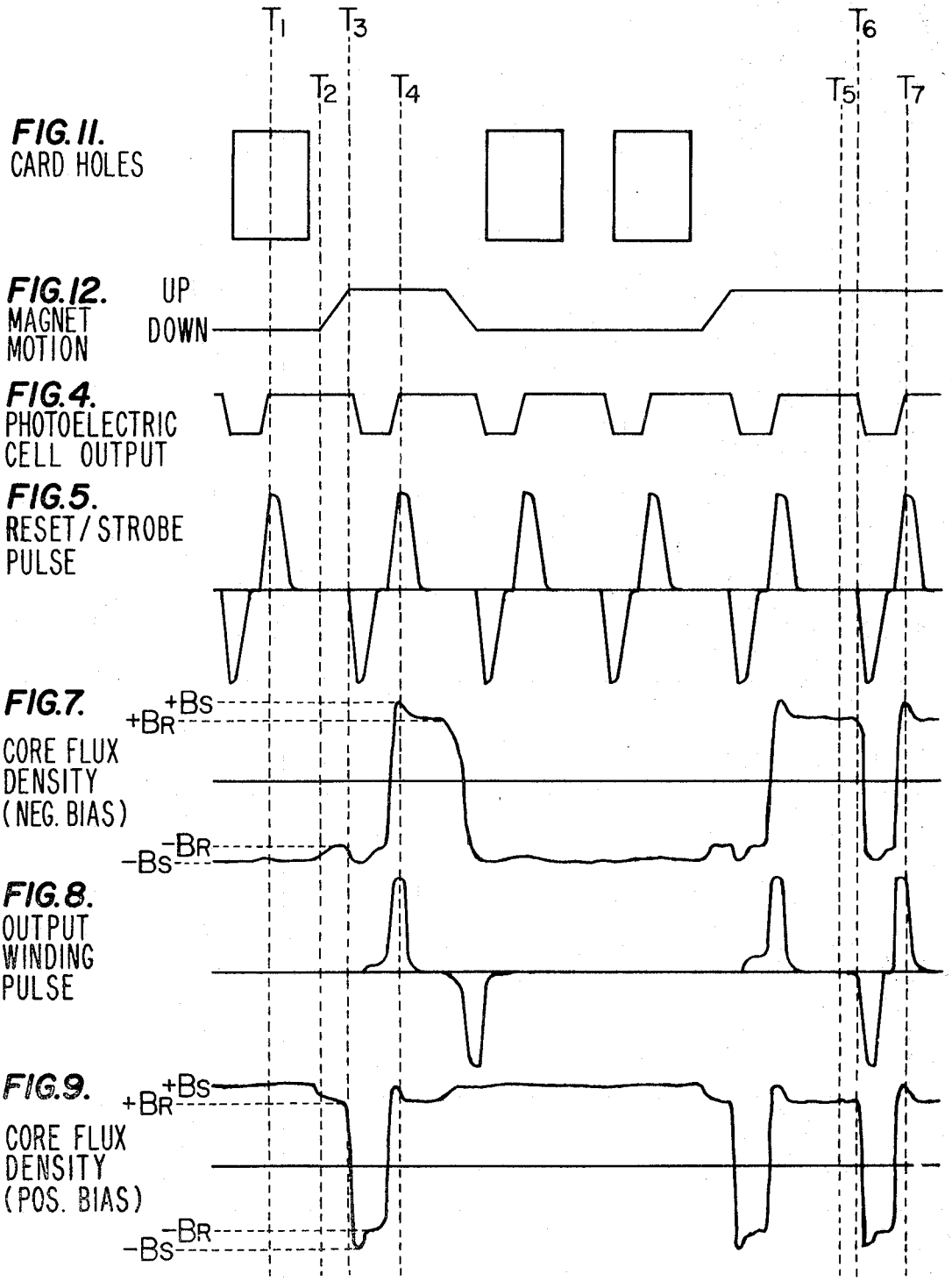

3,622,757

APPARATUS FOR ELECTRICALLY RESPONDING TO SURFACE DEVIATIONS ON A MOVING MEDIUM

SUMMARY OF THE INVENTION

The subject of this application relates generally to an apparatus for electrically responding to, or for the "reading" of, indicia in the form of perforations or surface deviations on a moving medium. Specifically the apparatus comprises a source of magnetic flux, for example, a magnet, which in response to indicia on the medium, controls the electrical output of an electrical conductor to which a cyclic change of flux, or strobing pulse, is applied. In the preferred embodiment a permanent magnet acts as a controlling flux source by alternately saturating and unsaturating a ferromagnetic core on which is wound an electrical conductor. Whenever the ferromagnetic core is magnetically saturated by the controlling flux source an attempt by another flux source or strobing means will be ineffective to induce an electrical pulse in the conductor by changing the flux. The resultant electrical output of the electrical conductor corresponds to indicia on the moving medium.

DESCRIPTION OF THE DRAWINGS

FIG. 4 is an illustration of the waveform representing the photoelectric cell output;

FIG. 5 is an illustration of the waveform representing the output from the differentiator;

FIG. 7 is a timing diagram which represents the variation with time of magnetic flux density in a ferrite core with a negatively biased saturation level during a typical reading operation;

FIG. 8 is the waveform of the electrical output from the conductor or output winding during a typical reading operation;

FIG. 9 is a timing diagram which represents the variations with time of magnetic flux density in a ferrite core with a positively biased saturation level during a typical reading operation;

FIG. 11 is a timing diagram of holes on a punched card; and

FIG. 12 is a timing diagram illustrating the movement of the permanent magnet between its effective or down position and its ineffective or up position.

Referring to FIGS. 1 and 2, a flexural member 21 with one end statically mounted to a support member 22, journals a perforation-responsive flux source actuator such as star wheel rider 23 that is disposed in relation to a planar surface 24 so that a medium having indicia in the form of perforations or surface deviations, for example a punched card 25, moving on the planar surface will ride beneath and in contact with the star wheel. To the free end of the flexural member 21 is attached a magnetic flux source, or permanent magnet 26, which moves with the flexural member in a vertical direction responding to the vertical motion of the star wheel 23 as it drops into and raises out of holes in the punched card 27.

Figure 1:
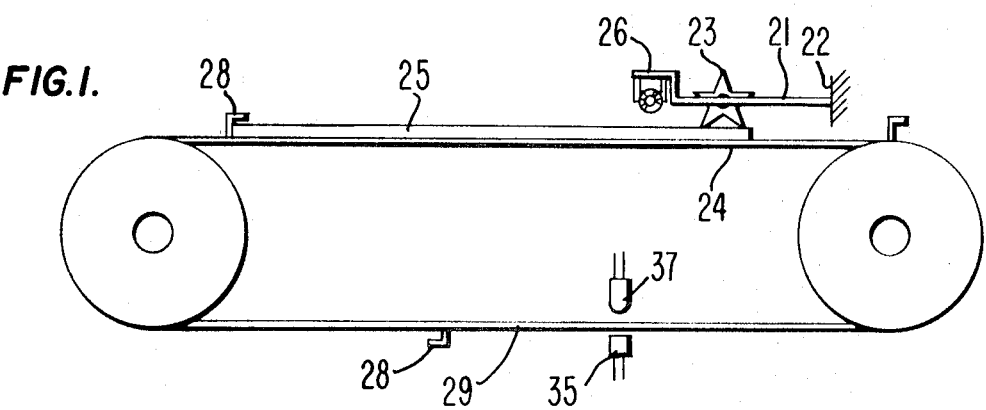
FIG. 1 is a schematic representation of a card reader mechanism incorporating an embodiment of the invention.
Figure 2:
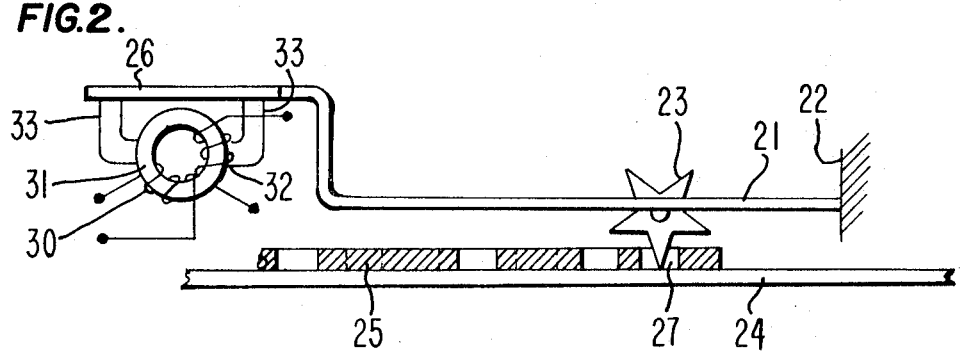
FIG. 2 is an enlarged fragmentary vie of the mechanism of FIG. 1.

A flange 28 projecting from a driven belt 29 pushes the punched card 25 in a direction perpendicular to the axis of rotation of the star wheel 23 at a predetermined rate along the planar surface 24.

Statically disposed beneath the permanent magnet 26 is an actuatable magnetic flux source, or strobe winding 30, having a ferromagnetic core 31. About the core 31 is wound an electrically conductive coil, or output winding 32, that shares a flux path, i.e., the core, with the strobe winding 30. Two pole pieces 33 that are spaced apart on opposite sides of the circular dimension of the core 31 extend upwardly to a position at which each pole piece contacts a different pole of the permanent magnet 26 when the magnet is in its lowest vertical position. In this configuration, to periodically saturate and unsaturate the core 31 the permanent magnet moves vertically between an effective position in contact with the pole pieces 33 and an ineffective position apart from the pole pieces in response to the star wheel's 23 vertical displacement on the card 25.

Figure 3:
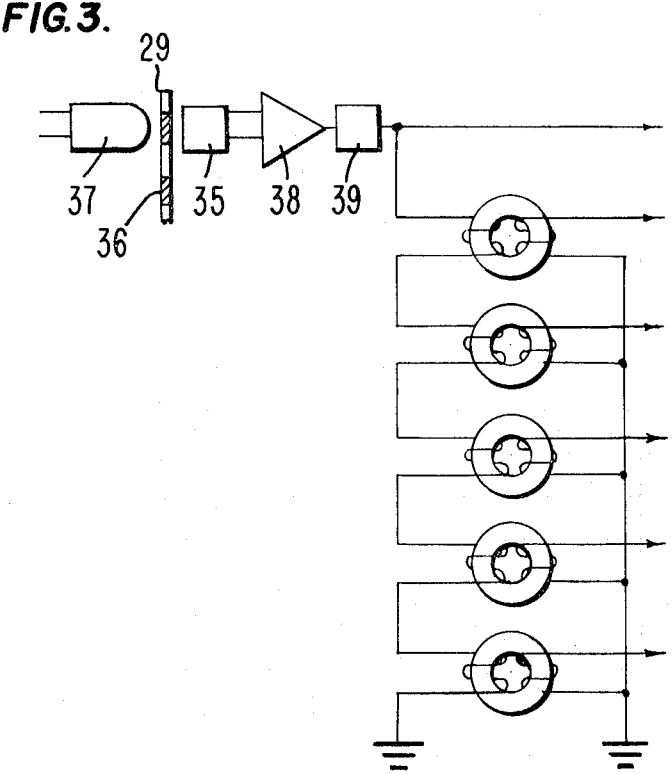
FIG. 3 is a schematic representing an electrical environment of the invention.

The different inductive properties processed by a saturated and unsaturated core are utilized to respond to or "read" the punched card. As described above, the saturation of the core 31 depends upon the star wheel's 23 vertical position; either the star wheel is in a hole in the card or out of a hole in the card or in transition between those two positions. In the preferred embodiment, as illustrated in FIGS. 3 and 4, a pulse is generated by a flux source actuator such as a well-known photoelectric cell 35 at a rate determined by the spacing of perforations 36 in the driven belt 29 that are spaced-apart predetermined distances to periodically block a beam of light emanating from a light source 37 and impinging upon the photoelectric cell.

The photoelectric cell 35 output, as illustrated by FIG. 4, is passed through an amplifier 38, and through a differentiator 39. The output from the differentiator, or the reset/strobe pulse, as illustrated by FIG. 5, consists of a negative going or reset pulse and a positive going or strobe pulse. If at the time the strobe pulse is applied to the strobe winding 30 of the core 31, the permanent magnet 26 is in contact with the pole pieces 33 of the core, thereby saturating the core, an output pulse in the output winding 32 will be inhibited. Conversely, if the core is magnetically unsaturated when the strobe pulse is applied to the strobe windings 30, an output pulse will be induced in the output winding 32. The output pulse depends upon the relationship: $V = N d\Phi/dt$; where $V$ is the output voltage, $N$ is the number of turns of the output winding, and $d\Phi/dt$ is time rate of change of magnetic flux passing through the output winding.

Figure 6:
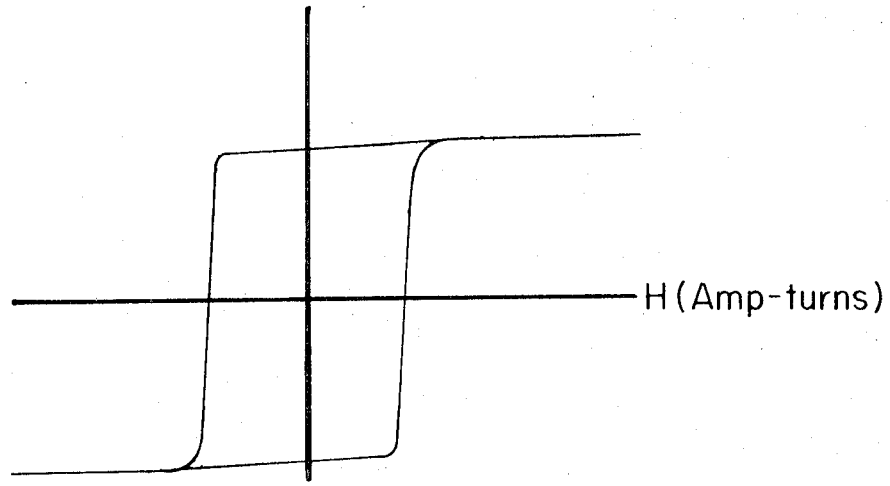
FIG. 6 is a graph of a hysteresis loop of a typical ferrite material.

The ability of a strobe pulse to induce a change of flux within a core of sufficient rate and magnitude to induce an output pulse of sufficient amplitude and duration to reliably distinguish it from random noise depends, among other things, upon the magnetic history of the core and upon certain of its magnetic properties. In the preferred embodiment, a ferrite core with a relatively square hysteresis loop, as illustrated in FIG. 6, has been chosen.

The preferred embodiment described above utilizes the permanent magnet 26 as a flux source to saturate the core 31 with a flux in a direction opposite that of the flux induced by the strobe input 30. The permanent magnet could also be disposed so that it would saturate the core in the same direction as the strobe input, as illustrated in FIG. 9. Equally good results would be obtained using this configuration.

OPERATION

Referring to the timing and waveform diagrams, when a punched card 25 moves along the planar surface 24 the star wheel 23 enters a hole in the card thereby dropping the permanent magnet 26 onto the pole pieces 33 of the ferrite core 31. Contact of the magnet 26 with the pole pieces 33 magnetically saturates the core 31. After the magnet is lowered a hole in the driven belt 29 permits the light source 37 directed toward the photoelectric cell 35 to activate the cell producing a pulse from the cell as illustrated in FIG. 4. The pulse is amplified and passed through a differentiator resulting in a reset/strobe pulse consisting of a negative-going pulse or reset pulse at the leading edge of the photocell output pulse and a positive-going pulse, or strobe pulse, at the trailing edge of the photocell output pulse, as illustrated in FIG. 5. The strobe winding 30 is electrically connected with the reset/strobe pulse and shares the ferrite core 31 with the output winding 32. At time $t_1$ the core 31 is saturated by a relatively intensive magnetizing force associated with the magnet 26. A strobe pulse in the strobe winding 30 at time $t_1$ is ineffective in changing the magnetic flux of the core 31; consequently, no output pulse is induced in the output windings 32, as illustrated in FIG. 8.

At time $t_2$ the star wheel 23 raises out of the hole and onto the surface of the card 25 thereby raising the magnet 26 from the pole pieces 33 of the ferrite core 31. The resulting magnetic state of the core 31 changes from its negative saturation level $-B_s$, as illustrated in FIG. 7, to its residual level $-B_r$. The photoelectric cell generates another reset/strobe pulse at time $t_3$. The negative or reset portion of the reset/strobe pulse forces the core momentarily to its negative saturation state $-B_s$. The positive or strobe portion of the reset/strobe pulse induces a rapid change of flux in the core 31 resulting in an output pulse at the output winding 32 as represented in FIG. 8 at time $t_4$.

The need for the reset portion of the reset/strobe pulse is graphically illustrated by FIG. 7. When two consecutive nonhole columns of the punched card 25 pass under the star wheel 23, the core 31 is in a positive residual magnetic state at time $t_5$. Another strobe pulse on the core 31 while the core is in a positive residual state would change the flux density of the core so slightly that an output pulse of detectable magnitude would not be induced in the output winding 32. However, a reset pulse that occurs at $t_6$, changes the ferrite core 31 to a negative residual magnetic state from which a strobe pulse can induce a sufficient change of flux to produce a readable output pulse, as illustrated at time $t_7$ in FIG. 8.

Figure 10:
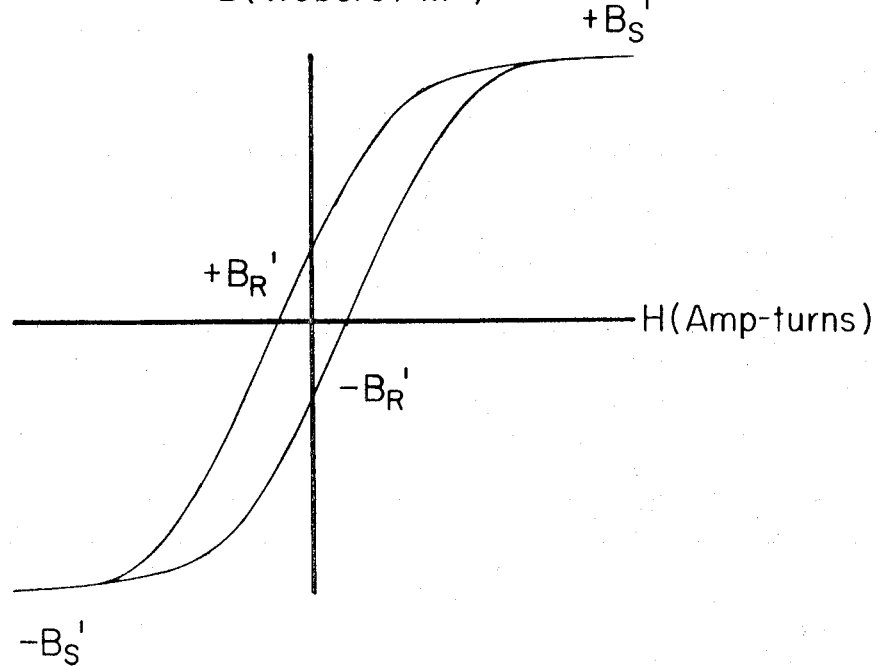
FIG. 10 is a graph of a hysteresis loop of a typical soft iron material.

In order to obviate a reset pulse required by the ferrite core 31, a core of soft iron material could be used. The residual flux density $B_R 1$ of soft iron material, by a narrow hysteresis loop, such as illustrated in FIG. 10, has a sufficiently different value from 5saturation flux density $B_S 1$ that a strobe pulse that saturates the core would induce a change of flux of sufficient magnitude to induce a readable output pulse. An increased magnetizing force H would be required for the soft iron core in order to overcome the slow switching time characteristic of soft iron.

I claim:

1. Apparatus for electrically responding to indicia in the form of perforations or surface deviations on a moving medium, comprising:
   an output winding,
   a strobe winding,
   a ferromagnetic core forming a path for magnetic flux between said output and said strobe windings,
   an electrical pulse generator electrically coupled to said strobe winding for generating electrical pulses of alternating polarity in a predetermined timed relationship with the moving medium, the alternating electrical pulses being respectively effective to magnetize said ferromagnetic core in alternate and opposite directions, the alternating magnetization of said core thus operating to induce electrical pulses in said output winding,
   an actuatable magnetic flux source magnetically communicatable with said core for magnetically saturating said core in one of said alternate and opposite directions, the magnetic flux communicated to said core by said actuatable magnetic flux source being effective to substantially maintain the magnetic state of said core in the one of said alternate and opposite directions in resistance to a countervailing magnetic influence of said electrical pulse generator, and
   a perforation-responsive flux source actuator coupled with said actuatable magnetic flux source for actuating said flux source in response to perforations or surface deviations on a selected portion of said moving medium, whereby the periodic actuation of said magnetic flux source in response to the indicia on the moving medium periodically inhibits the induction of electrical pulses in said output winding, the induced electrical output on said output winding thus being indicative of the indicia on the moving medium.

2. Apparatus as defined in claim 1 wherein said actuatable magnetic flux source is a permanent magnet juxtaposed to said ferromagnetic core.

3. Apparatus as defined in claim 2 wherein said perforation-responsive flux source actuator has a rider disposed in contact with said moving medium, said rider being displaceable into and out of surface deviations or perforations on said medium, said permanent magnet being carried by said actuator between an effective and ineffective position for respectively saturating and unsaturating said ferromagnetic core.

4. Apparatus as defined in claim 3 wherein said rider is a star wheel journaled by said actuator for rolling upon the surface of said moving medium.

5. Apparatus as defined in claim 3 wherein said electrical pulse generator generates successive pairs of alternating pulses in said strobe winding in phase with the passage of indicia positions on said moving medium past said rider.

* * * * *

PO-1050
(5/69)

UNITED STATES PATENT OFFICE
CERTIFICATE OF CORRECTION

Patent No. 3,622,757　　　　　　　　Dated　November 23, 1971

Inventor(s) Paul R. Hoffman

It is certified that error appears in the above-identified patent and that said Letters Patent are hereby corrected as shown below:

Col. 3, line 33, should read --material, characterized by a narrow--.

Col. 3, line 35, should read --from its saturation--.

Signed and sealed this 2nd day of May 1972.

(SEAL)
Attest:

EDWARD M. FLETCHER, JR.　　　　ROBERT GOTTSCHALK
Attesting Officer　　　　　　　　Commissioner of Patents